US012741530B2

(12) United States Patent
Kim et al.

(10) Patent No.: US 12,741,530 B2
(45) Date of Patent: Sep. 22, 2026

(54) CHARGE PORT DOOR ASSEMBLY

(71) Applicants: Hyundai Motor Company, Seoul (KR); Kia Corporation, Seoul (KR); PHA Co., Ltd., Daegu (KR)

(72) Inventors: Sang Il Kim, Hwaseong-si (KR); Kyung Min Lee, Hwaseong-si (KR)

(73) Assignees: Hyundai Motor Company, Seoul (KR); Kia Corporation, Seoul (KR); PHA Co., Ltd., Daegu (KR)

( * ) Notice: Subject to any disclaimer, the term of this patent is extended or adjusted under 35 U.S.C. 154(b) by 323 days.

(21) Appl. No.: 18/644,460

(22) Filed: Apr. 24, 2024

(65) Prior Publication Data

US 2025/0187430 A1 Jun. 12, 2025

(30) Foreign Application Priority Data

Dec. 7, 2023 (KR) ........................ 10-2023-0177101

(51) Int. Cl.

| | |
|---|---|
| ***B60K 15/05*** | (2006.01) |
| ***F16H 35/10*** | (2006.01) |
| *B60L 53/16* | (2019.01) |
| *F16H 1/20* | (2006.01) |
| *F16H 35/00* | (2006.01) |

(52) U.S. Cl.

CPC ............. *B60K 15/05* (2013.01); *F16H 35/10* (2013.01); *B60K 2015/053* (2013.01); *B60L 53/16* (2019.02); *F16H 1/206* (2013.01); *F16H 2035/005* (2013.01)

(58) Field of Classification Search

None

See application file for complete search history.

(56) References Cited

U.S. PATENT DOCUMENTS

| | | | | |
|---|---|---|---|---|
| 7,185,938 | B2 * | 3/2007 | Beck | B60K 15/05 292/207 |
| 8,853,996 | B2 | 10/2014 | Sekido et al. | |
| 10,245,943 | B2 * | 4/2019 | Mori | B60K 15/05 |
| 12,109,877 | B2 * | 10/2024 | Kaneko | B60K 15/05 |
| 2012/0019206 | A1 | 1/2012 | Sekido et al. | |
| 2020/0079210 | A1 * | 3/2020 | Jeon | B60K 15/05 |

FOREIGN PATENT DOCUMENTS

| | | | |
|---|---|---|---|
| KR | 101275885 | B1 | 6/2013 |
| KR | 20220155488 | A | 11/2022 |
| KR | 102558337 | B1 | 7/2023 |

* cited by examiner

*Primary Examiner* — Joseph D. Pape

(74) *Attorney, Agent, or Firm* — Slater Matsil, LLP

(57) ABSTRACT

An embodiment charge port door assembly includes a housing including an opening, a door movable relative to the housing, a first shaft configured to move the door, a second shaft spaced apart from the first shaft, and an actuator disposed between the first shaft and the second shaft and configured to drive the first shaft or the second shaft.

20 Claims, 9 Drawing Sheets

CHARGE PORT DOOR ASSEMBLY

CROSS-REFERENCE TO RELATED APPLICATIONS

This application claims the benefit of Korean Patent Application No. 10-2023-0177101, filed on Dec. 7, 2023, which application is hereby incorporated herein by reference.

TECHNICAL FIELD

The present disclosure relates to a charge port door assembly.

BACKGROUND

An electric vehicle may include a charge port used for charging a battery and a charge port door assembly covering and uncovering the charge port.

The charge port door assembly may include a housing having an opening communicating with the charge port, a door mounted movably with respect to the housing, a shaft moving the door, and an actuator driving the shaft.

In the charge port door assembly according to the related art, however, as the actuator is placed in a biased position on either side of the housing, the size and weight of the charge port door assembly may increase and the length of the shaft may be relatively increased, causing distortion of the shaft, which degrades the operability of the door.

The above information described in this background section is provided to assist in understanding the background of the inventive concept and may include any technical concept which is not considered as the prior art that is already publicly known.

SUMMARY

The present disclosure relates to a charge port door assembly. Particular embodiments relate to a charge port door assembly designed to improve operability of a door.

Embodiments of the present disclosure can solve problems occurring in the prior art while advantages achieved by the prior art are maintained intact.

An embodiment of the present disclosure provides a charge port door assembly designed to improve operability of a door.

According to an embodiment of the present disclosure, a charge port door assembly may include a housing having an opening, a door movable relative to the housing, a first shaft moving the door, a second shaft spaced apart from the first shaft, and an actuator disposed between the first shaft and the second shaft and driving at least one of the first shaft and the second shaft.

The actuator may include a casing and a rotor rotatably mounted in the casing. The rotor may be connected to the first shaft.

The rotor may include a main body rotatably mounted in the casing and a first projection extending from the main body toward the first shaft. The first projection may protrude from a first sidewall of the casing and may be fixed to the first shaft.

The charge port door assembly may further include a first sealing mechanism providing a seal between the first sidewall of the casing and the rotor.

The rotor may further include a second projection extending from the main body toward the second shaft.

The second projection of the rotor may be connected to the second shaft through a connection pin, and the connection pin may protrude from a second sidewall of the casing.

The charge port door assembly may further include a second sealing mechanism providing a seal between the second sidewall of the casing and the second shaft.

The second projection of the rotor may be rotatably supported with respect to the casing through a support pin.

The casing may further include a support projection protruding toward the second shaft, and the second shaft may be rotatably supported around the support projection.

The actuator may include a motor and a gear train transmitting a torque of the motor to the rotor.

The gear train may include an input gear connected to the motor, a final gear coupled to the rotor, and one or more transmission gears meshing with the input gear and the final gear.

The charge port door assembly may further include a tolerance ring press-fitted between an inner surface of the final gear and an outer surface of the rotor. The tolerance ring may have a plurality of projections protruding toward the final gear.

The plurality of projections may be frictionally coupled to the inner surface of the final gear.

The first shaft may be rotatably supported with respect to the housing through a first support pin, and the second shaft may be rotatably supported with respect to the housing through a second support pin.

The charge port door assembly may further include a first main link extending from the first shaft and a second main link extending from the second shaft. The first main link and the second main link may be configured to pivotably connect the door to the housing.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
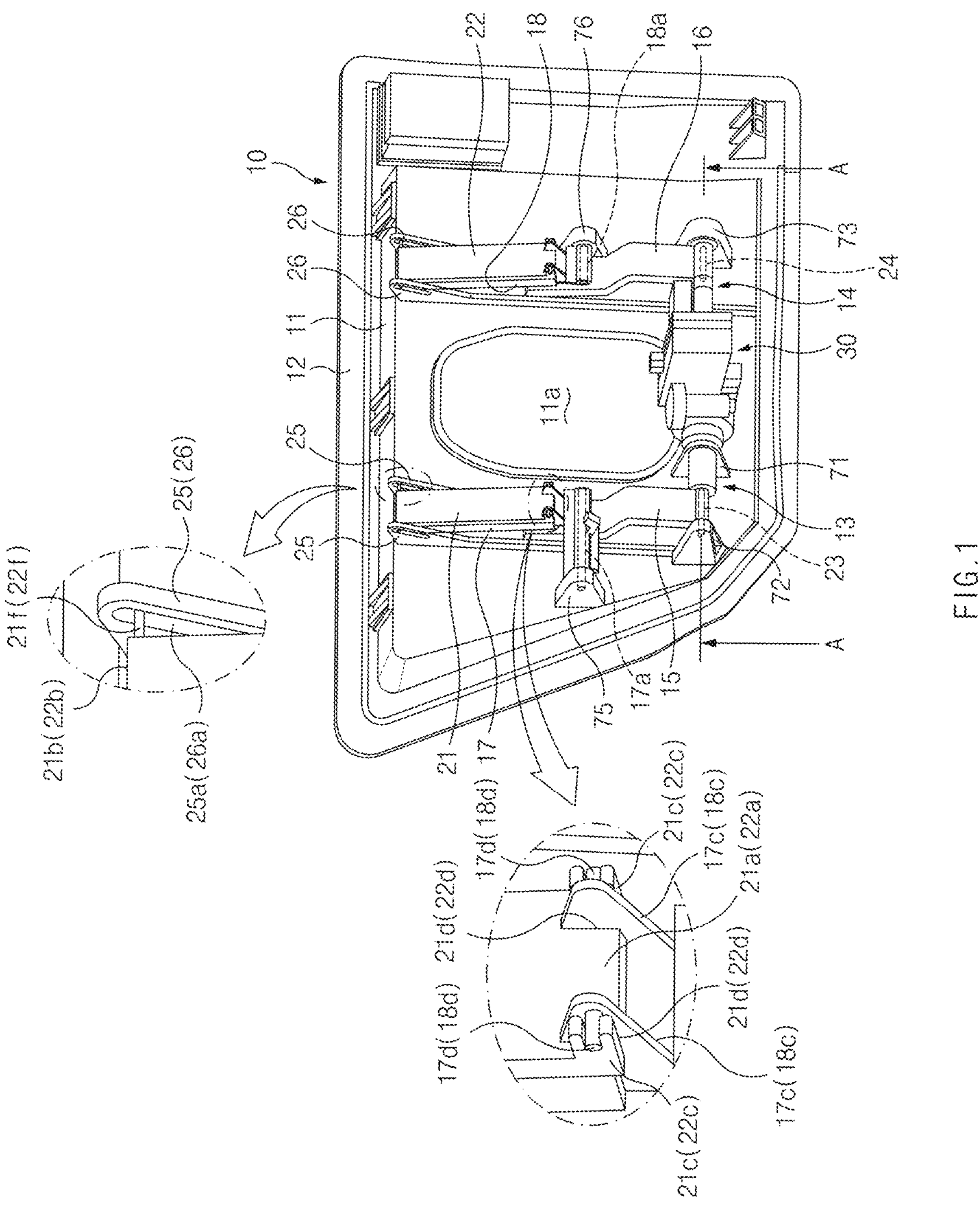
FIG. 1 illustrates a perspective view of a charge port door assembly according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence, order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art and are not to be interpreted as having ideal or excessively formal meanings unless clearly defined as having such in the present application.

Referring to FIG. 1, a charge port door assembly 10 according to an exemplary embodiment of the present disclosure may include a housing 11, a door 12 movable relative to the housing 11, a first shaft 13 moving the door 12, a second shaft 14 spaced apart from the first shaft 13, and an actuator 30 disposed between the first shaft 13 and the second shaft 14.

The housing 11 may have an opening 11*a* communicating with a charge port connected to a battery of the vehicle. The opening 11*a* may be located in a middle portion of the housing 11, and the housing 11 may be mounted on a vehicle body.

Figure 7:
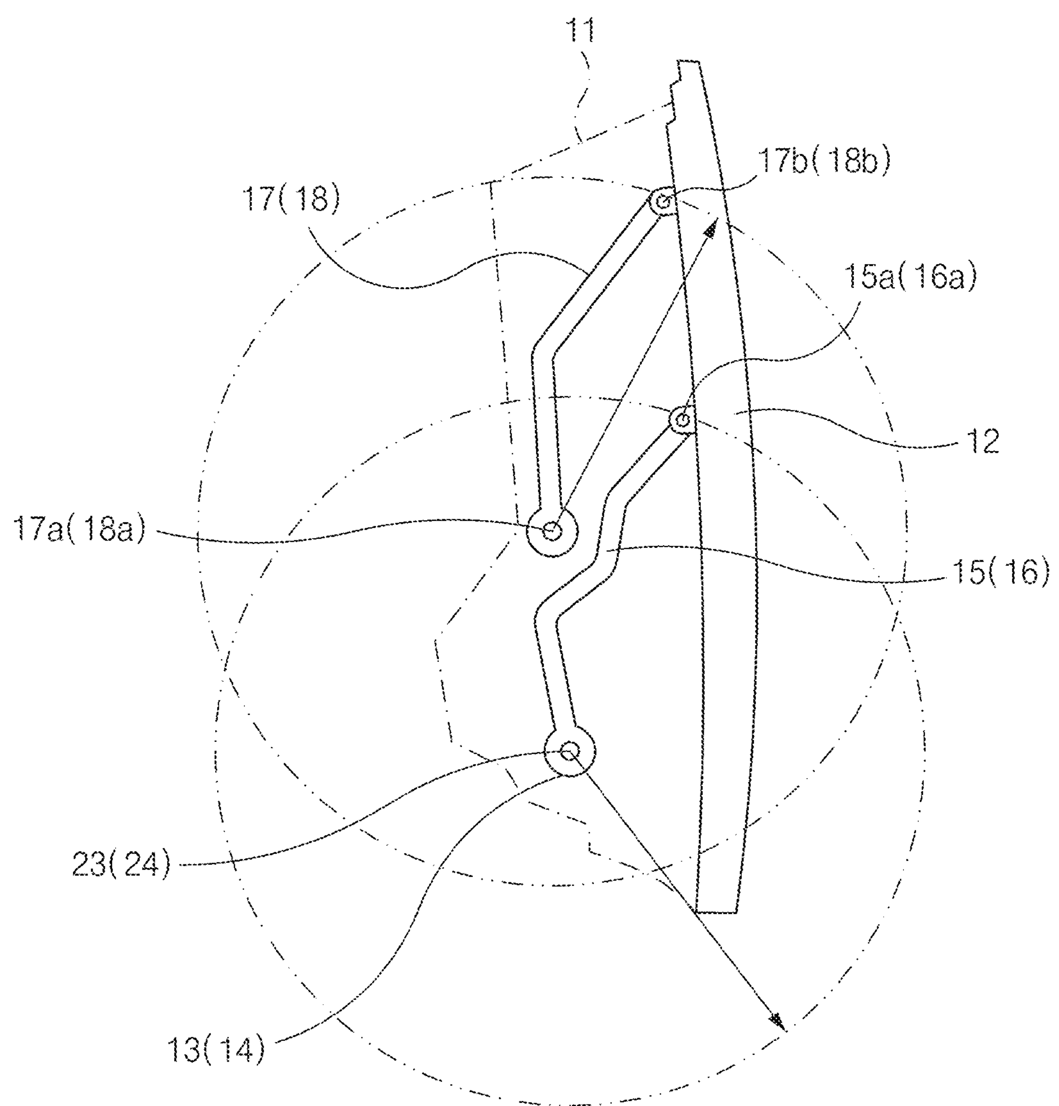
FIG. 7 illustrates a state in which a door of a charge port door assembly according to an exemplary embodiment of the present disclosure is in a closed position.
Figure 9:
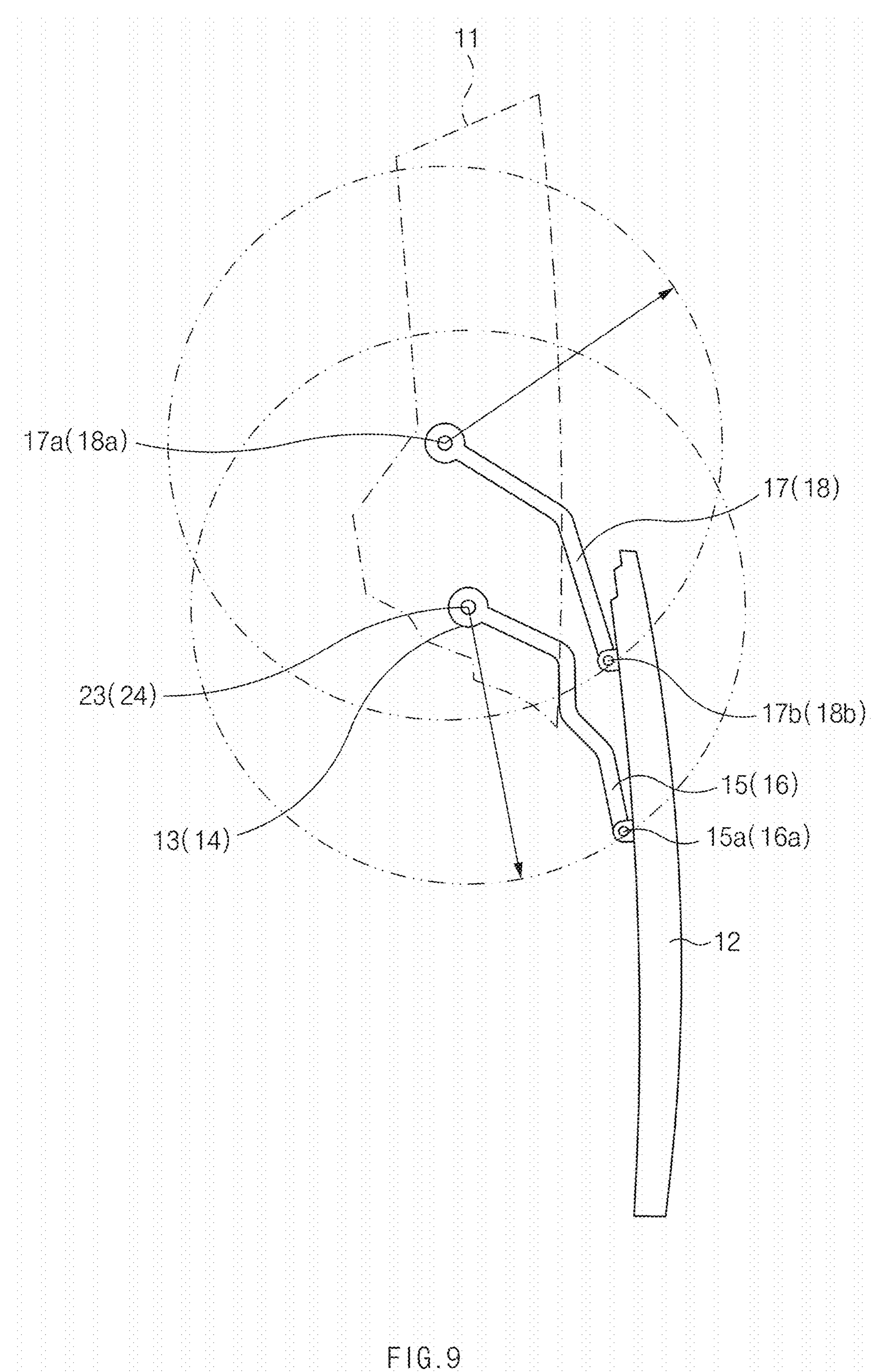
FIG. 9 illustrates a state in which a door of a charge port door assembly according to an exemplary embodiment of the present disclosure is in an open position.

The door 12 may be configured to move relative to the housing 11. The door 12 may move between a closed position (see FIG. 7) and an open position (see FIG. 9). Referring to FIG. 7, when the door 12 is in the closed position, the door 12 may cover the housing 11, and accordingly the opening 11*a* of the housing 11 may be covered. Referring to FIG. 9, when the door 12 is in the open position, the door 12 may uncover the housing 11, and accordingly the opening 11*a* of the housing 11 may be uncovered.

The first shaft 13 may be spaced apart from the second shaft 14, and the actuator 30 may be disposed between the first shaft 13 and the second shaft 14. The actuator 30 may be disposed in the housing 11 to be aligned with the opening 11*a* of the housing 11. According to an exemplary embodiment, a longitudinal axis of the first shaft 13 may be aligned with a longitudinal axis of the second shaft 14.

Referring to FIG. 1, the charge port door assembly 10 according to an exemplary embodiment of the present disclosure may include a first main link 15 extending from the first shaft 13 and a second main link 16 extending from the second shaft 14. The first main link 15 and the second main link 16 may be disposed on both sides of the opening 11*a* of the housing 11.

Figure 8:
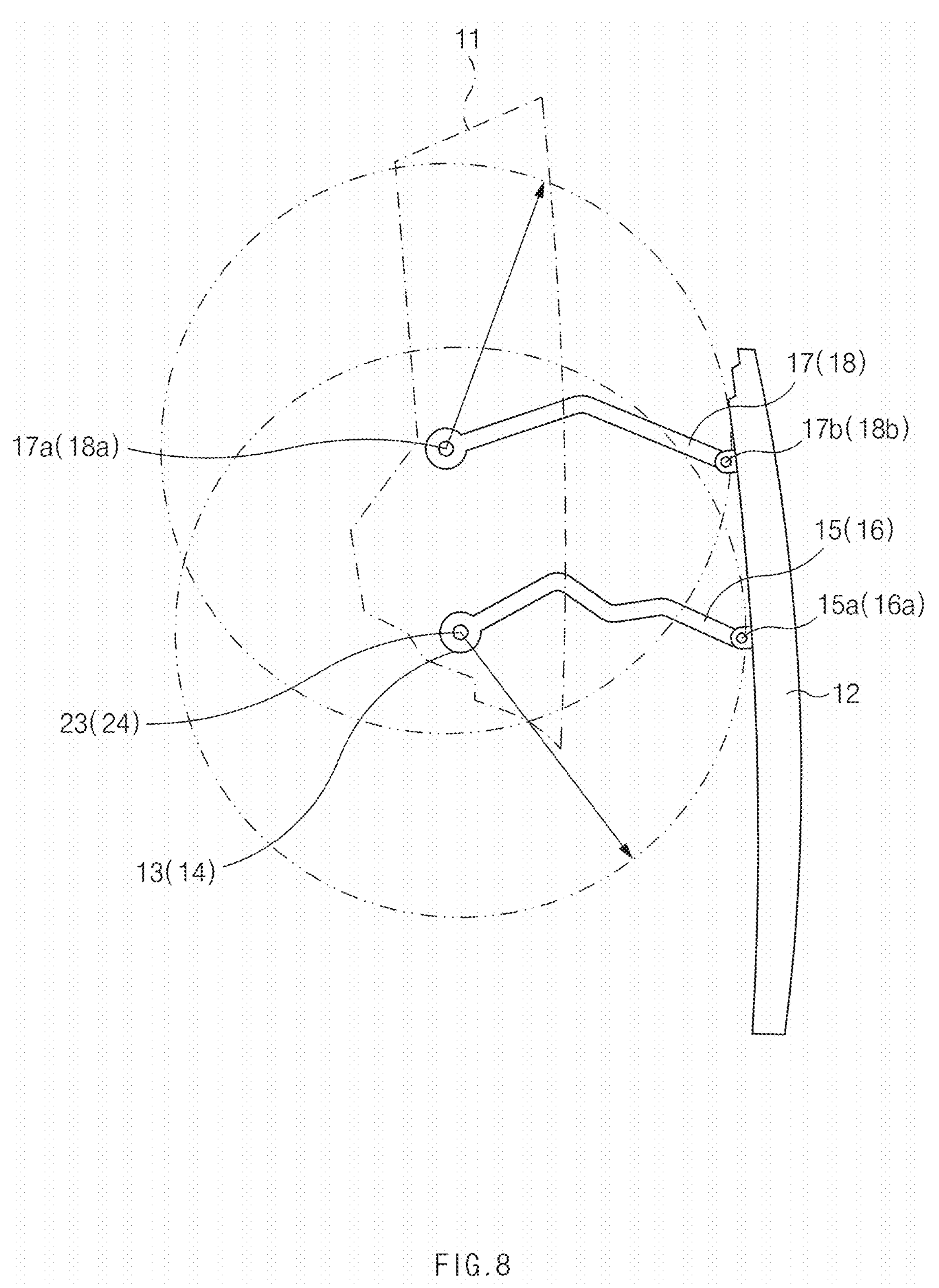
FIG. 8 illustrates a state in which a door of a charge port door assembly according to an exemplary embodiment of the present disclosure is in a partially open position.

The first main link 15 may extend from the first shaft 13 toward the door 12, and the first main link 15 may pivotably connect the door 12 to the housing 11 through the first shaft 13. Referring to FIGS. 7 to 9, a first end portion of the first main link 15 may be integrally connected to the first shaft 13, and a second end portion of the first main link 15 may be hinged to the door 12 through a pivot pin 15*a*.

The second main link 16 may extend from the second shaft 14 toward the door 12, and the second main link 16 may pivotably connect the door 12 to the housing 11 through the second shaft 14. Referring to FIGS. 7 to 9, a first end portion of the second main link 16 may be integrally connected to the second shaft 14, and a second end portion of the second main link 16 may be hinged to the door 12 through a pivot pin 16*a*.

The actuator 30 may be configured to drive at least one of the first shaft 13 and the second shaft 14. As at least one of the first shaft 13 and the second shaft 14 is rotated by the actuator 30, the first main link 15 and the second main link 16 may pivot around the first shaft 13 and the second shaft 14.

The actuator 30 may be disposed between the first shaft 13 and the second shaft 14, and the actuator 30 may be configured to drive at least one of the first shaft 13 and the second shaft 14. As the actuator 30 is disposed between the first shaft 13 and the second shaft 14, the first shaft 13 and the second shaft 14 may be divided by the actuator 30. Accordingly, the length of the first shaft 13 and the length of the second shaft 14 may be relatively reduced so that distortion of the first and second shafts 13 and 14 may be prevented, and thus the freedom of layout of related components may be improved.

Figure 2:
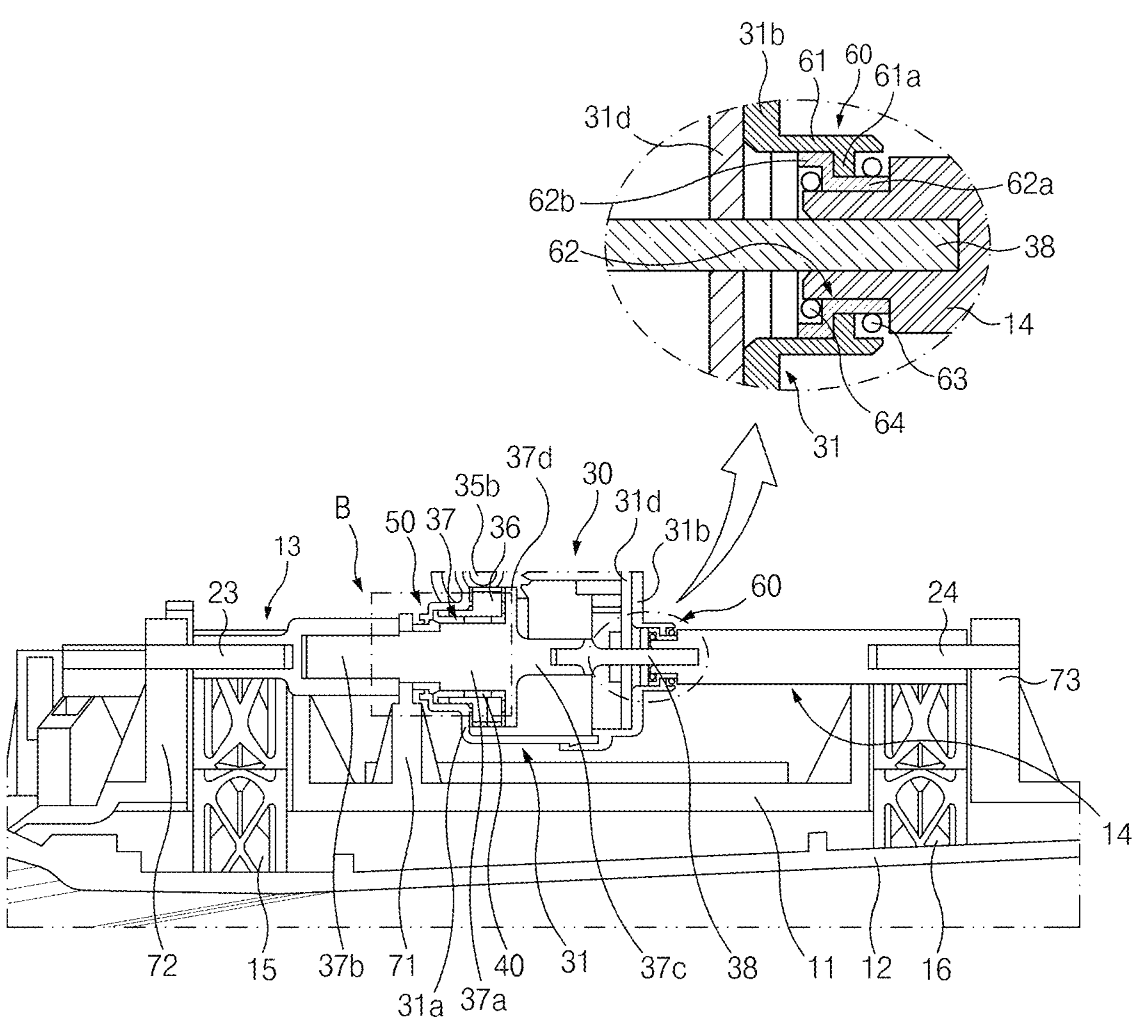
FIG. 2 illustrates a cross-sectional view taken along line A-A of FIG. 1.

Referring to FIG. 2, the actuator 30 may include a casing 31 and a rotor 37 rotatably mounted in the casing 31. The casing 31 may include a first sidewall 31*a* facing the first shaft 13 and a second sidewall 31*b* facing the second shaft 14.

Figure 3:
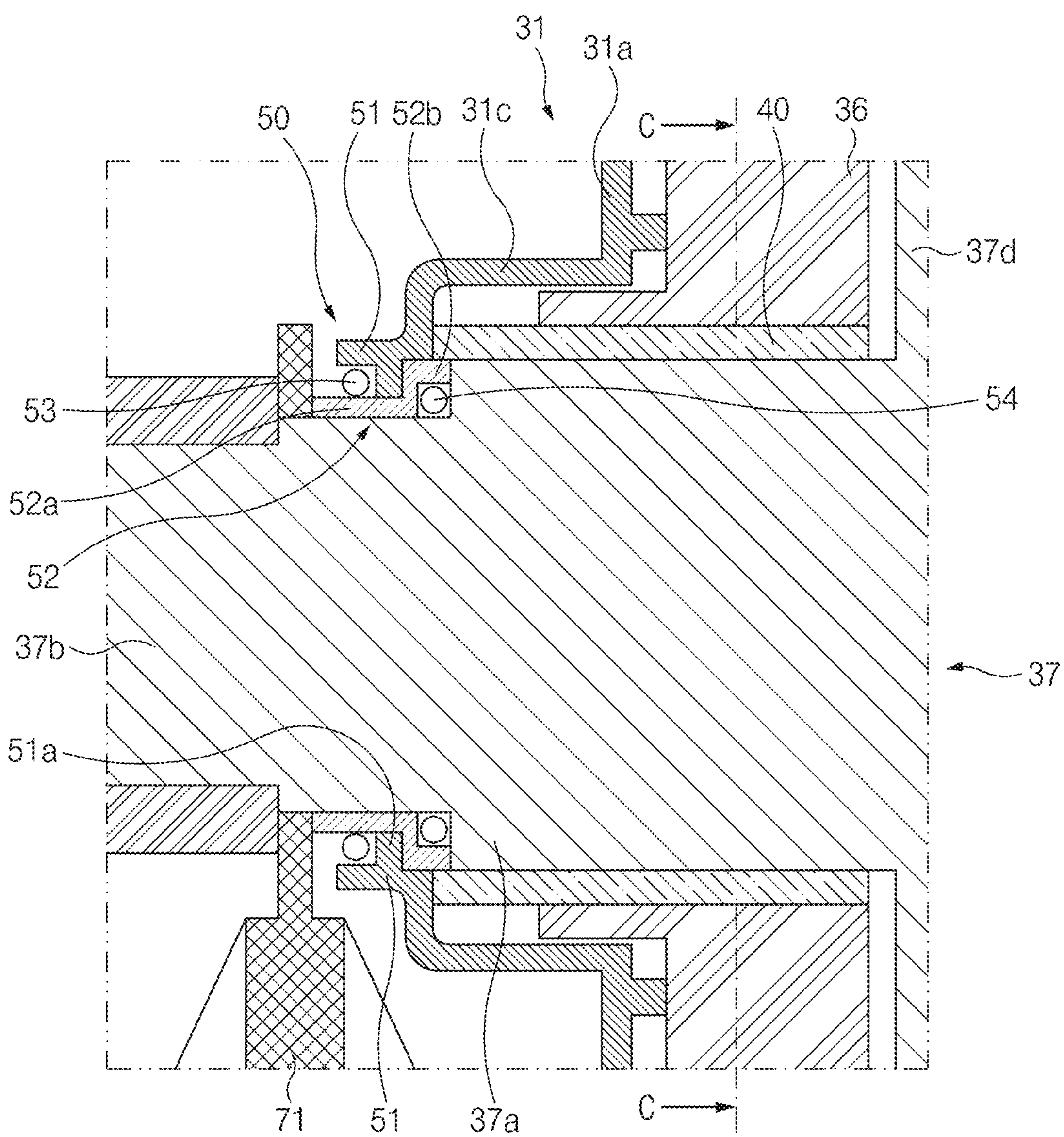
FIG. 3 illustrates an enlarged view of portion B of FIG. 2.

Referring to FIG. 3, the casing 31 may have a cylindrical portion 31*c* protruding from the first sidewall 31*a* toward the first shaft 13, and an inner diameter of the cylindrical portion 31*c* may be greater than an outer diameter of the rotor 37.

The rotor 37 may include a main body 37*a* and a first projection 37*b* extending from the main body 37*a* toward the first shaft 13.

The main body 37*a* may be rotatably mounted in the casing 31, and the main body 37*a* may have a cylindrical shape with a predetermined diameter. A portion of the main body 37*a* may protrude from the casing 31. The housing 11 may include a support lug 71 rotatably supporting a portion of the main body 37*a* of the rotor 37.

Referring to FIG. 2, the first shaft 13 may have a first end portion fixed to the first projection 37*b* of the rotor 37, and the first end portion of the first shaft 13 may have a mounting hole into which the first projection 37*b* is fitted. The first projection 37*b* may be fitted into the mounting hole of the first end portion of the first shaft 13 so that the first projection 37*b* of the rotor 37 may be fixed to the first end portion of the first shaft 13.

Referring to FIG. 2, the first shaft 13 may have a second end portion rotatably supported with respect to the housing 11 through a first support pin 23, and the first support pin 23 may be fitted into a mounting hole of the second end portion of the first shaft 13 so that the first support pin 23 may be fixed to the second end portion of the first shaft 13. The housing 11 may have a support lug 72 rotatably supporting the first support pin 23. The first support pin 23 may be rotatably supported on the support lug 72 of the housing 11 so that the second end portion of the first shaft 13 may be rotatably supported on the support lug 72 of the housing 11 through the first support pin 23.

The rotor 37 may further include a second projection 37*c* extending from the main body 37*a* toward the second shaft 14. The second projection 37*c* of the rotor 37 may be connected to the second shaft 14 through a connection pin 38. Referring to FIG. 2, the second shaft 14 may have a first end portion connected to the second projection 37*c* of the rotor 37 through the connection pin 38. A first end portion of the connection pin 38 may be fitted into a mounting hole of the second projection 37*c* of the rotor 37 so that the first end portion of the connection pin 38 may be fixed to the second projection 37*c* of the rotor 37. A second end portion of the connection pin 38 may be fitted into a mounting hole of the first end portion of the second shaft 14 so that the second end portion of the connection pin 38 may be fixed to the first end portion of the second shaft 14. Accordingly, the first end portion of the second shaft 14 may be connected to the second projection 37*c* of the rotor 37 through the connection pin 38.

Referring to FIG. 2, the second shaft 14 may have a second end portion rotatably supported with respect to the housing 11 through a second support pin 24, and the second support pin 24 may be fitted into a mounting hole of the second end portion of the second shaft 14 so that the second support pin 24 may be fixed to the second end portion of the second shaft 14. The housing 11 may have a support lug 73 rotatably supporting the second support pin 24. The second support pin 24 may be rotatably supported on the support lug 73 of the housing 11 so that the second end portion of the second shaft 14 may be rotatably supported on the support lug 73 of the housing 11 through the second support pin 24.

The first projection 37*b* may have a cylindrical shape with a predetermined diameter less than the diameter of the main body 37*a*. The second projection 37*c* may have a cylindrical shape with a predetermined diameter less than the diameter of the main body 37*a* and the diameter of the first projection 37*b*. The first projection 37*b* may be fitted into the mounting hole of the first shaft 13 so that the first projection 37*b* may be fixed to the first shaft 13. The second projection 37*c* may be fitted into the mounting hole of the second shaft 14 so that the second projection 37*c* may be fixed to the second shaft 14. As the rotor 37 rotates, the first shaft 13 may rotate, and the first shaft 13 may allow the door 12 to pivot through the first main link 15 so that the door 12 may move between the closed position and the open position.

The first projection 37*b* of the rotor 37 may protrude from the first sidewall 31*a* and the cylindrical portion 31*c* of the casing 31 of the actuator 30, and a first sealing mechanism 50 may provide a seal between the first sidewall 31*a* of the casing 31 and the main body 37*a* of the rotor 37. Accordingly, the first sealing mechanism 50 may prevent moisture, foreign objects, and the like from entering the first sidewall 31*a* of the casing 31 of the actuator 30 and the main body 37*a* of the rotor 37.

Referring to FIG. 3, the first sealing mechanism 50 may include a first sleeve 51 protruding from the cylindrical portion 31*c* of the casing 31, a first bush 52 interposed between an inner surface of the first sleeve 51 and an outer surface of the main body 37*a*, an outer sealing member 53 disposed between the inner surface of the first sleeve 51 and an outer surface of the first bush 52, and an inner sealing member 54 disposed between an inner surface of the first bush 52 and the outer surface of the main body 37*a*. The first sleeve 51 may surround a portion of the main body 37*a*. The first bush 52 may have a small-diameter portion 52*a* having an outer diameter less than an inner diameter of the first sleeve 51 and a large-diameter portion 52*b* having an outer diameter equal to the inner diameter of the first sleeve 51. The small-diameter portion 52*a* may be fitted into a portion of the main body 37*a*. The first bush 52 may have a shoulder formed between the small-diameter portion 52*a* and the large-diameter portion 52*b*, and the first sleeve 51 may have an inner projection 51*a* protruding from the inner surface thereof toward the center of the first sleeve 51. The inner projection 51*a* of the first sleeve 51 may support the shoulder of the first bush 52. The outer sealing member 53 may be relatively far from the first sidewall 31*a* and the cylindrical portion 31*c* of the casing 31, and the outer sealing member 53 may be interposed between the inner surface of the first sleeve 51 and an outer surface of the small-diameter portion 52*a* of the first bush 52. The inner sealing member 54 may be located inside the cylindrical portion 31*c* of the casing 31, and the inner sealing member 54 may be interposed between an inner surface of the large-diameter portion 52*b* of the first bush 52 and the outer surface of the main body 37*a*. Accordingly, an inner diameter of the outer sealing member 53 may be greater than an inner diameter of the inner sealing member 54.

The second projection 37*c* of the rotor 37 may be connected to the second shaft 14 through the connection pin 38, and the connection pin 38 may have the first and second end portions opposing each other. The first end portion of the connection pin 38 may be fitted into the mounting hole of the second projection 37*c* so that the first end portion of the connection pin 38 may be fixed to the second projection 37*c*. The second end portion of the connection pin 38 may be fitted into the mounting hole of the second shaft 14 so that the second end portion of the connection pin 38 may be fixed to the second shaft 14.

The second end portion of the connection pin 38 may extend through a through hole of the second sidewall 31*b* of the casing 31 so that the connection pin 38 may protrude from the second sidewall 31*b* of the casing 31 of the actuator 30, and a second sealing mechanism 60 may provide a seal between the second sidewall 31*b* of the casing 31 and the first end portion of the second shaft 14. Accordingly, the second sealing mechanism 60 may prevent moisture, foreign objects, and the like from entering the second sidewall 31*b* of the casing 31 of the actuator 30 and the second shaft 14.

Referring to FIG. 2, the second sealing mechanism 60 may include a second sleeve 61 protruding from the second sidewall 31*b* of the casing 31, a second bush 62 interposed between an inner surface of the second sleeve 61 and an outer surface of the connection pin 38, an outer sealing member 63 disposed between the inner surface of the second sleeve 61 and an outer surface of the second bush 62, and an inner sealing member 64 disposed between an inner surface of the second bush 62 and the outer surface of the connection pin 38. The second sleeve 61 may surround a portion of the connection pin 38. The second bush 62 may have a small-diameter portion 62*a* having an outer diameter less than an inner diameter of the second sleeve 61 and a large-diameter portion 62*b* having an outer diameter equal to the inner diameter of the second sleeve 61. The small-diameter portion 62*a* may be fitted into a portion of the connection pin 38, and the small-diameter portion 62*a* may face the second shaft 14. The large-diameter portion 62*b* may face the interior space of the casing 31. The second bush 62 may have a shoulder formed between the small-diameter portion 62*a* and the large-diameter portion 62*b*, and the second sleeve 61 may have an inner projection 61*a* protruding from the inner surface thereof toward the center of the second sleeve 61. The inner projection 61*a* of the second sleeve 61 may support the shoulder of the second bush 62. The outer sealing member 63 may be relatively far from the second sidewall 31*b* of the casing 31, and the outer sealing member 63 may be interposed between the inner surface of the second sleeve 61 and an outer surface of the small-diameter portion 62*a* of the second bush 62. The inner sealing member 64 may be relatively close to the second sidewall 31*b* of the casing 31, and the inner sealing member 64 may be interposed between an inner surface of the large-diameter portion 62*b* of the second bush 62 and the outer surface of the connection pin 38. Accordingly, an inner diameter of the outer sealing member 63 may be greater than an inner diameter of the inner sealing member 64.

Figure 5:
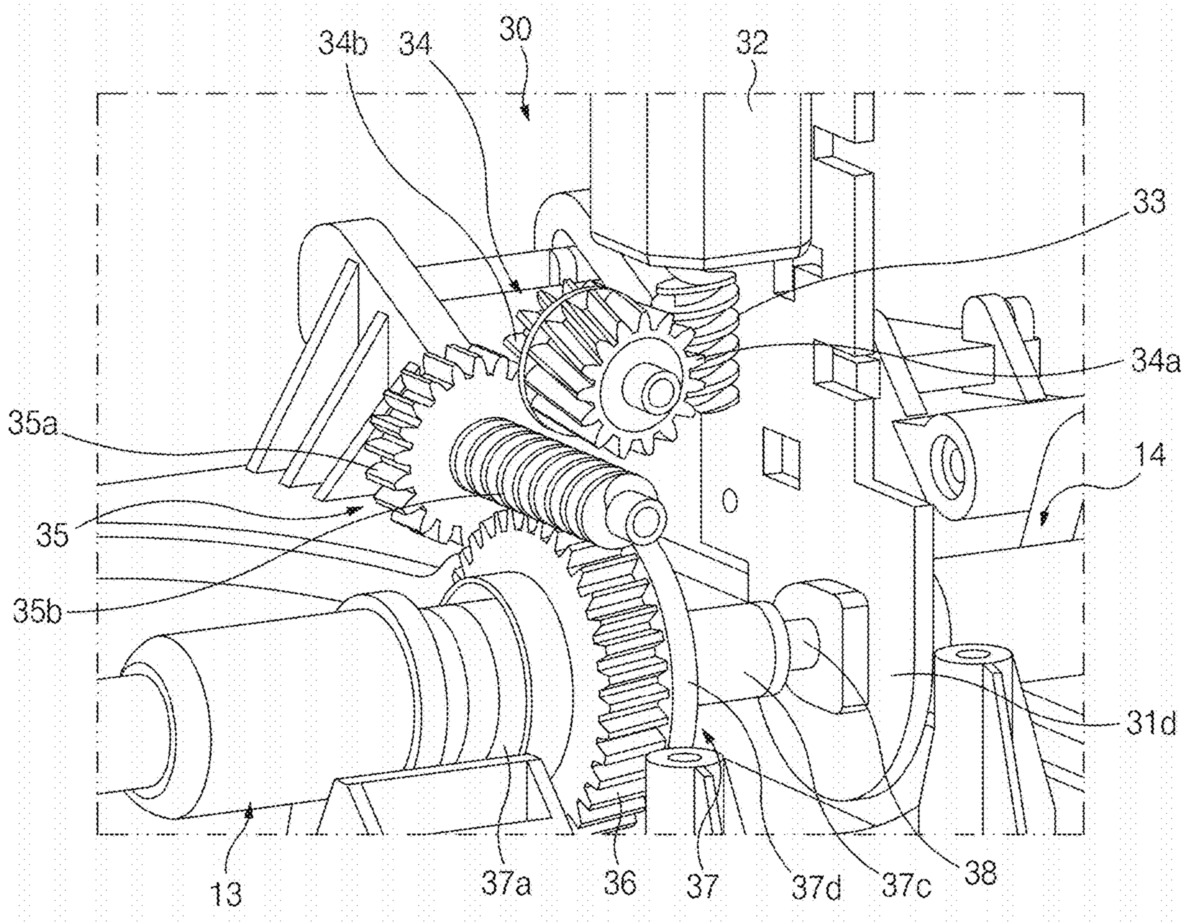
FIG. 5 illustrates a perspective view of a motor, a gear train, a rotor, a first shaft, and a second shaft of a charge port door assembly according to an exemplary embodiment of the present disclosure.

Referring to FIG. 5, the actuator 30 may include a motor 32 and a gear train 33, 34, 35, and 36 transmitting a torque of the motor 32 to the rotor 37. The actuator 30 may include a printed circuit board (PCB) 31*d* disposed inside the casing 31, and the PCB 31*d* may be attached to the second sidewall 31*b*. The gear train 33, 34, 35, and 36 may include an input gear 33 directly connected to the motor 32, a final gear 36 coupled to the rotor 37 through a tolerance ring 40, and one or more transmission gears 34 and 35 meshing with the input gear 33 and the final gear 36. A first transmission gear 34 and a second transmission gear 35 may be disposed between the input gear 33 and the final gear 36. The first transmission gear 34 may include an input gear portion 34*a* meshing with the input gear 33 and an output gear portion 34*b* meshing with the second transmission gear 35. A central axis of the input gear portion 34*a* may be aligned with a central axis of the output gear portion 34*b* along a central axis of the first transmission gear 34. The second transmission gear 35 may include an input gear portion 35*a* meshing with the output gear portion 34*b* of the first transmission gear 34 and an output gear portion 35*b* meshing with the final gear 36. A central axis of the input gear portion 35*a* may be aligned with a central axis of the output gear portion 35*b* along a central axis of the second transmission gear 35. The torque of the motor 32 may be transmitted to the final gear 36 through the input gear 33, the first transmission gear 34, and the second transmission gear 35.

Figure 4:
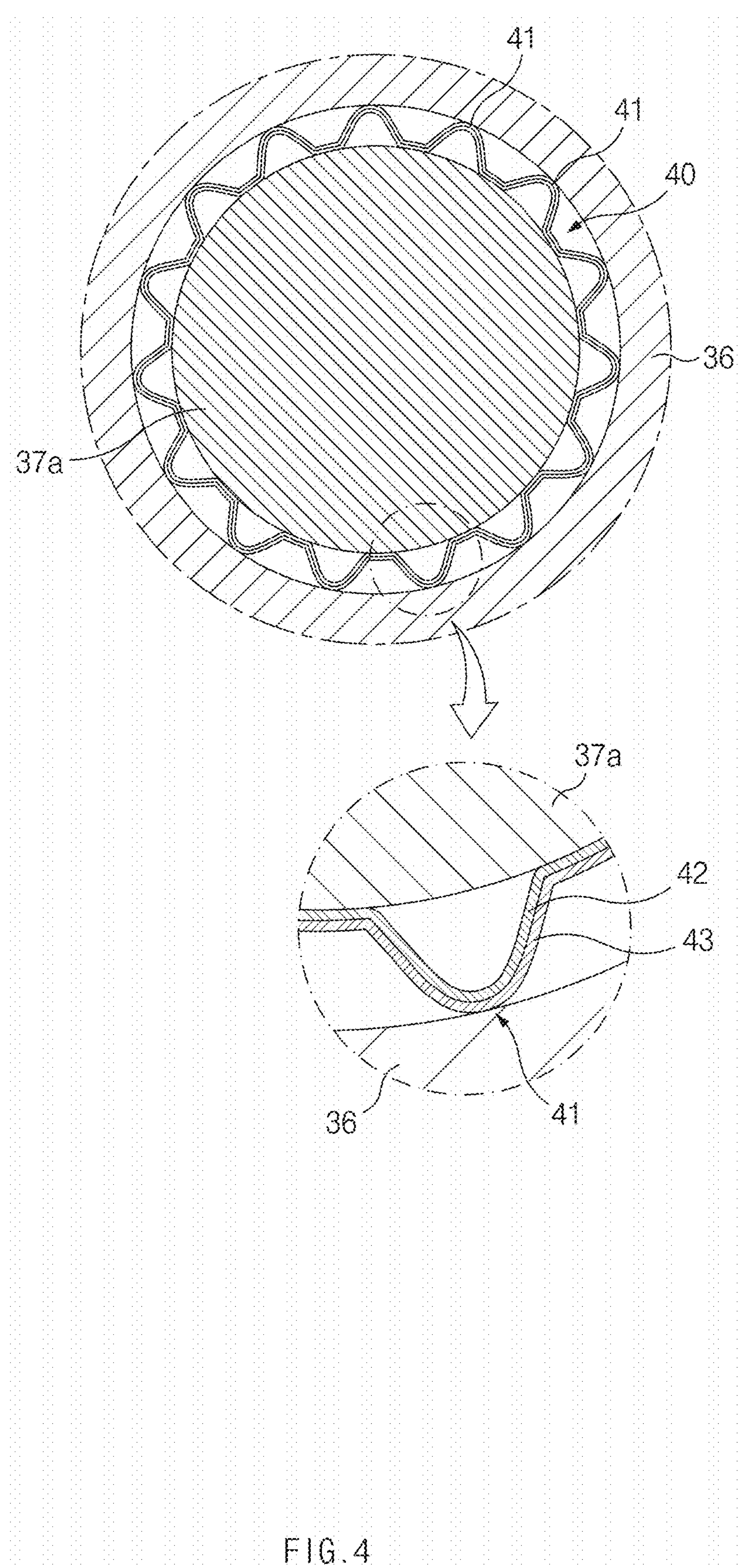
FIG. 4 illustrates a cross-sectional view taken along line C-C of FIG. 3.

Referring to FIG. 4, the tolerance ring 40 may be press-fitted between the outer surface of the main body 37*a* of the rotor 37 and an inner surface of the final gear 36 so as to operate as a friction fastener. The tolerance ring 40 may have a plurality of projections 41 protruding in an outer diameter direction thereof, and the plurality of projections 41 may be spaced apart from each other at a predetermined pitch along a circumferential direction of the tolerance ring 40. An inner surface of the tolerance ring 40 may be frictionally coupled to the outer surface of the main body 37*a* of the rotor 37, and the plurality of projections 41 may be frictionally coupled to the inner surface of the final gear 36. The tolerance ring 40 may include a corrugated metal strip 42 and a polymer layer 43 attached to an outer surface of the metal strip 42. The metal strip 42 may be made of stainless steel, and the polymer layer 43 may be made of polytetrafluoroethylene (PTFE).

The torque of the motor 32 may be set to be relatively less than a frictional force between the projections 41 of the tolerance ring 40 and the inner surface of the final gear 36. The torque of the motor 32 may be transmitted to the rotor 37 through the input gear 33, the first transmission gear 34, the second transmission gear 35, the final gear 36, and the tolerance ring 40, and accordingly the rotor 37 may be rotated by the motor 32.

When a user manually pivots the door 12, a torque generated by the pivoting of the door 12 may be transmitted to the rotor 37 through the first main link 15, the second main link 16, the first shaft 13, and the second shaft 14. When the torque transmitted from the rotor 37 to the final gear 36 is greater than the frictional force between the tolerance ring 40 and the final gear 36, slip may occur between the projections of the tolerance ring 40 and the final gear 36. Accordingly, when the user manually pivots the door 12, an overload may be blocked from being transmitted to the motor 32.

Referring to FIGS. 1 and 7 to 9, the charge port door assembly 10 according to an exemplary embodiment of the present disclosure may further include a first auxiliary link 17 and a second auxiliary link 18 allowing the door 12 to be pivotably connected to the housing 11. The first auxiliary link 17 and the second auxiliary link 18 may be disposed on both sides of the opening 11*a* of the housing 11. The first auxiliary link 17 may be aligned with the first main link 15, and the second auxiliary link 18 may be aligned with the second main link 16. The first auxiliary link 17 and the second auxiliary link 18 may assist the movement of the first main link 15 and the second main link 16.

A first end portion of the first auxiliary link 17 may be pivotably mounted on the housing 11 through a hinge pin 17*a*, and a second end portion of the first auxiliary link 17 may be pivotably mounted on the door 12 through a hinge pin 17*b*. The housing 11 may include a support lug 75 rotatably supporting the hinge pin 17*a*, and the door 12 may include a support lug rotatably supporting the hinge pin 17*b*. The first end portion of the first auxiliary link 17 may be spaced apart from the first end portion of the first main link 15 on the housing 11, and the second end portion of the first auxiliary link 17 may be spaced apart from the second end portion of the first main link 15 on the door 12.

A first end portion of the second auxiliary link 18 may be pivotably mounted on the housing 11 through a hinge pin 18*a*, and a second end portion of the second auxiliary link 18 may be pivotably mounted on the door 12 through a hinge pin 18*b*. The housing 11 may include a support lug 76 rotatably supporting the hinge pin 18*a*, and the door 12 may include a support lug rotatably supporting the hinge pin 18*b*. The first end portion of the second auxiliary link 18 may be spaced apart from the first end portion of the second main link 16 on the housing 11, and the second end portion of the second auxiliary link 18 may be spaced apart from the second end portion of the second main link 16 on the door 12.

Referring to FIG. 1, the charge port door assembly 10 according to another exemplary embodiment of the present disclosure may further include a first link cover 21 covering the first auxiliary link 17 and a second link cover 22 covering the second auxiliary link 18.

A first end portion 21*a* of the first link cover 21 may be pivotably connected to the first end portion of the first auxiliary link 17. A pair of hinge lugs 21*c* may be provided to the first end portion 21*a* of the first link cover 21, and a pair of slots 21*d* may be formed in the first end portion 21*a* of the first link cover 21. Each slot 21*d* may be adjacent to the corresponding hinge lug 21*c*. A pair of lugs 17*c* may protrude upwardly from the first end portion of the first auxiliary link 17, and each lug 17*c* may have a pivot pin 17*d*. Each lug 17*c* may be movably inserted into the corresponding slot 21*d* of the first link cover 21, and the pivot pin 17*d* of each lug 17*c* may be rotatably received in the corresponding hinge lug 21*c* of the first link cover 21.

A second end portion 21*b* of the first link cover 21 may be movably mounted on the housing 11. A pair of guide projections 21*f* may protrude from both sides of the second end portion 21*b* of the first link cover 21, respectively, and the housing 11 may have a pair of guide lugs 25 located on both sides of the pair of guide projections 21*f*. Each guide lug 25 may have a guide slot 25*a*. The guide projection 21*f* of the second end portion 21*b* of the first link cover 21 may be guided along the guide slot 25*a* of the corresponding guide lug 25.

As described above, the first end portion 21*a* of the first link cover 21 may be pivotably connected to the first end portion of the first auxiliary link 17, and the second end portion 21*b* of the first link cover 21 may be movably mounted to the guide lugs 25 of the housing 11 so that the first link cover 21 may move together with the first auxiliary link 17.

A first end portion 22*a* of the second link cover 22 may be pivotably connected to the first end portion of the second auxiliary link 18. A pair of hinge lugs 22*c* may be provided to the first end portion 22*a* of the second link cover 22, and a pair of slots 22*d* may be formed in the first end portion 22*a* of the second link cover 22. Each slot 22*d* may be adjacent to the corresponding hinge lug 22*c*. A pair of lugs 18*c* may protrude upwardly from the first end portion of the second auxiliary link 18, and each lug 18*c* may have a pivot pin 18*d*. Each lug 18*c* may be movably inserted into the corresponding slot 22*d* of the second link cover 22, and the pivot pin 18*d* of each lug 18*c* may be rotatably received in the corresponding hinge lug 22*c* of the second link cover 22.

A second end portion 22*b* of the second link cover 22 may be movably mounted on the housing 11. A pair of guide projections 22*f* may protrude from both sides of the second end portion 22*b* of the second link cover 22, respectively, and the housing 11 may have a pair of guide lugs 26 located on both sides of the pair of guide projections 22*f*. Each guide lug 26 may have a guide slot 26*a*. The guide projection 22*f* of the second end portion 22*b* of the second link cover 22 may be guided along the guide slot 26*a* of the corresponding guide lug 26.

As described above, the first end portion 22*a* of the second link cover 22 may be pivotably connected to the first end portion of the second auxiliary link 18, and the second end portion 22*b* of the second link cover 22 may be movably mounted to the guide lugs 26 of the housing 11 so that the second link cover 22 may move together with the second auxiliary link 18.

According to the exemplary embodiment illustrated in FIG. 2, the first shaft 13 may be connected to the first projection 37*b* of the rotor 37, and the second shaft 14 may be connected to the second projection 37*c* of the rotor 37 through the connection pin 38 so that the actuator 30 may drive the first shaft 13 and the second shaft 14 together.

Figure 6:
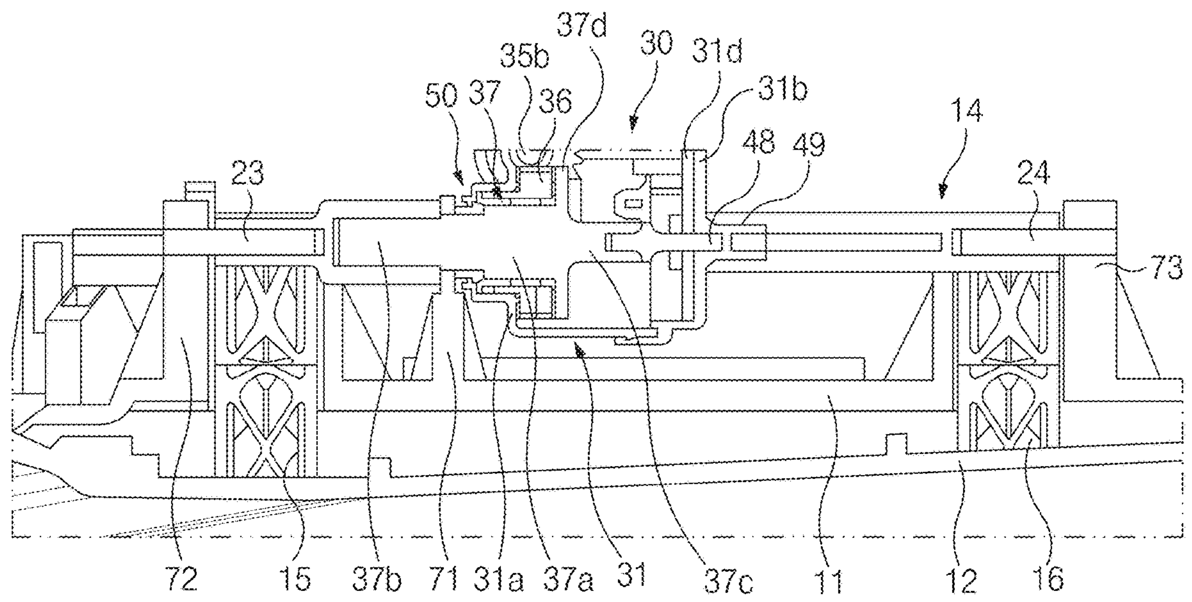
FIG. 6 illustrates a perspective view of a charge port door assembly according to another exemplary embodiment of the present disclosure.

Referring to FIG. 6, according to another exemplary embodiment of the present disclosure, the first shaft 13 may be connected to the first projection 37*b* of the rotor 37, and the second shaft 14 may not be connected to the second projection 37*c* of the rotor 37.

The second projection 37*c* of the rotor 37 may be rotatably supported on the second sidewall 31*b* of the casing 31 through a support pin 48. A first end portion of the support pin 48 may be fitted into the mounting hole of the second projection 37*c*, and a second end portion of the support pin 48 may be rotatably supported in a support recess of the second sidewall 31*b* of the casing 31 of the actuator 30. A support projection 49 may protrude from the second sidewall 31*b* of the casing 31 of the actuator 30 toward the second shaft 14, and a support recess may be formed in the first end portion of the second shaft 14. The support projection 49 may be received in the support recess of the first end portion of the second shaft 14. The first end portion of the second shaft 14 may be rotatably supported around the support projection 49 of the casing 31. Since the second shaft 14 is not connected to the rotor 37 of the actuator 30, the second shaft 14 may not be driven by the actuator 30. Accordingly, the first shaft 13 may be rotated by the actuator 30, and the second shaft 14 may be passively rotated by the rotation of the first shaft 13. Since the second shaft 14 does not extend through the second sidewall 31*b* of the casing 31, the second sidewall 31*b* of the casing 31 may be closed. The second projection 37*c* of the rotor 37 may be rotatably supported on the second sidewall 31*b* of the casing 31, and the first end portion of the second shaft 14 may be rotatably supported around the support projection 49 of the second sidewall 31*b* of the casing 31 so that the second sealing mechanism 60 may be removed. Accordingly, assemblability may be improved, quality defects may be less likely to occur, and the manufacturing cost of the charge port door assembly 10 may be relatively reduced. In addition, moisture, foreign objects, and the like may be prevented from entering the casing 31 through the second sidewall 31*b* of the casing 31, and operability of the charge port door assembly 10 may be improved.

Referring to FIG. 7, when the first main link 15 and the second main link 16 pivot counterclockwise, the first auxiliary link 17 and the second auxiliary link 18 may pivot together with the first main link 15 and the second main link 16, and the door 12 may move to a closed position in which the door 12 covers the housing 11.

Referring to FIG. 8, when the first main link 15 and the second main link 16 partially pivot clockwise in the state illustrated in FIG. 7, the first auxiliary link 17 and the second auxiliary link 18 may pivot together with the first main link 15 and the second main link 16, and the door 12 may move to a partially open position in which the door 12 partially uncovers the housing 11.

Referring to FIG. 9, when the first main link 15 and the second main link 16 fully pivot clockwise in the state illustrated in FIG. 8, the first auxiliary link 17 and the second auxiliary link 18 may pivot together with the first main link 15 and the second main link 16, and the door 12 may move to an open position in which the door 12 fully uncovers the housing 11.

As set forth above, according to exemplary embodiments of the present disclosure, the actuator may be disposed between the first shaft and the second shaft so that the first shaft and the second shaft may be divided by the actuator. Accordingly, the length of the first shaft and the length of the second shaft may be relatively reduced so that the distortion and damage of the first and second shafts may be prevented, and thus the freedom of layout of related components may be improved.

According to exemplary embodiments of the present disclosure, the charge port door assembly may be designed to remove the second sealing mechanism due to the following configurations: the second sidewall of the casing is closed; the second projection of the rotor is rotatably supported on the second sidewall of the casing; and the first end portion of the second shaft is rotatably supported around the support projection of the second sidewall of the casing. Thus, assemblability may be improved, quality defects may be less likely to occur, and the manufacturing cost of the charge port door assembly may be relatively reduced. In addition, moisture, foreign objects, and the like may be prevented from entering the casing through the second sidewall of the casing, and the operability of the charge port door assembly may be improved.

Hereinabove, although embodiments of the present disclosure have been described with reference to exemplary embodiments and the accompanying drawings, the present disclosure is not limited thereto, but it may be variously modified and altered by those skilled in the art to which the present disclosure pertains without departing from the spirit and scope of the present disclosure claimed in the following claims.

What is claimed is:

1. A charge port door assembly comprising:

a housing including an opening;

a door movable relative to the housing;

a first shaft configured to move the door;

a second shaft spaced apart from the first shaft; and an actuator disposed between the first shaft and the second shaft and configured to drive the first shaft or the second shaft.

2. The charge port door assembly according to claim 1, wherein the actuator comprises:

a casing; and a rotor rotatably mounted in the casing and connected to the first shaft.

3. The charge port door assembly according to claim 2, wherein the rotor comprises:

a main body rotatably mounted in the casing; and a first projection extending from the main body toward the first shaft, wherein the first projection protrudes from a first sidewall of the casing and is fixed to the first shaft.

4. The charge port door assembly according to claim 3, further comprising a first sealing mechanism configured to provide a seal between the first sidewall of the casing and the rotor.

5. The charge port door assembly according to claim 3, wherein the rotor further comprises a second projection extending from the main body toward the second shaft.

6. The charge port door assembly according to claim 5, wherein:

the second projection of the rotor is connected to the second shaft through a connection pin; and the connection pin protrudes from a second sidewall of the casing.

7. The charge port door assembly according to claim 6, further comprising a second sealing mechanism configured to provide a seal between the second sidewall of the casing and the second shaft.

8. The charge port door assembly according to claim 5, further comprising a support pin configured to rotatably support the second projection of the rotor with respect to the casing.

9. The charge port door assembly according to claim 5, wherein:

the casing further comprises a support projection protruding toward the second shaft; and the second shaft is rotatably supported around the support projection.

10. A charge port door assembly comprising:

a housing including an opening;

a door movable relative to the housing;

a first shaft configured to move the door;

a second shaft spaced apart from the first shaft; and an actuator disposed between the first shaft and the second shaft and configured to drive the first shaft or the second shaft, wherein the actuator comprises:

a casing;

a rotor rotatably mounted in the casing and connected to the first shaft;

a motor; and a gear train configured to transmit a torque of the motor to the rotor.

11. The charge port door assembly according to claim 10, wherein the gear train comprises an input gear connected to the motor, a final gear coupled to the rotor, and one or more transmission gears meshing with the input gear and the final gear.

12. The charge port door assembly according to claim 11, further comprising a tolerance ring press-fitted between an inner surface of the final gear and an outer surface of the rotor, wherein the tolerance ring comprises a plurality of projections protruding toward the final gear.

13. The charge port door assembly according to claim 12, wherein the plurality of projections of the tolerance ring are frictionally coupled to the inner surface of the final gear.

14. The charge port door assembly according to claim 10, wherein the rotor comprises:

a main body rotatably mounted in the casing;

a first projection extending from the main body toward the first shaft, wherein the first projection protrudes from a first sidewall of the casing and is fixed to the first shaft; and a second projection extending from the main body toward the second shaft, wherein the second projection of the rotor is connected to the second shaft through a connection pin that protrudes from a second sidewall of the casing.

15. The charge port door assembly according to claim 14, further comprising:

a first sealing mechanism configured to provide a seal between the first sidewall of the casing and the rotor; and a second sealing mechanism configured to provide a seal between the second sidewall of the casing and the second shaft.

16. A charge port door assembly comprising:

a housing including an opening;

a door movable relative to the housing;

a first shaft configured to move the door and rotatably supported with respect to the housing through a first support pin;

a second shaft spaced apart from the first shaft and rotatably supported with respect to the housing through a second support pin; and an actuator disposed between the first shaft and the second shaft and configured to drive the first shaft or the second shaft.

17. The charge port door assembly according to claim 16, further comprising:

a first main link extending from the first shaft and configured to pivotably connect the door to the housing; and a second main link extending from the second shaft and configured to pivotably connect the door to the housing.

18. The charge port door assembly according to claim 17, wherein the actuator comprises:

a casing; and a rotor rotatably mounted in the casing and connected to the first shaft.

19. The charge port door assembly according to claim 18, wherein the rotor comprises:

a main body rotatably mounted in the casing;

a first projection extending from the main body toward the first shaft, wherein the first projection protrudes from a first sidewall of the casing and is fixed to the first shaft; and a second projection extending from the main body toward the second shaft, wherein the second projection of the rotor is connected to the second shaft through a connection pin that protrudes from a second sidewall of the casing.

20. The charge port door assembly according to claim 19, further comprising:

a first sealing mechanism configured to provide a seal between the first sidewall of the casing and the rotor; and a second sealing mechanism configured to provide a seal between the second sidewall of the casing and the second shaft.

* * * * *